May 20, 1958   J. R. HARCLERODE   2,835,243
PRESSURE EQUALIZER ASSEMBLY FOR MASONRY SAWS
Filed Sept. 10, 1956   2 Sheets-Sheet 1

INVENTOR.
John R. Harclerode
BY
ATTORNEY

May 20, 1958     J. R. HARCLERODE     2,835,243
PRESSURE EQUALIZER ASSEMBLY FOR MASONRY SAWS
Filed Sept. 10, 1956     2 Sheets-Sheet 2
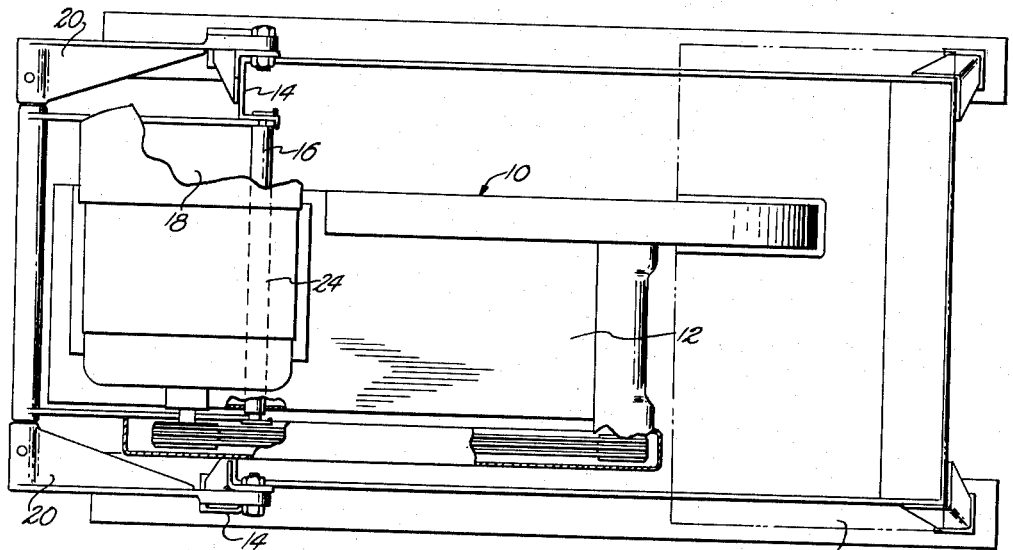
Fig. 4.
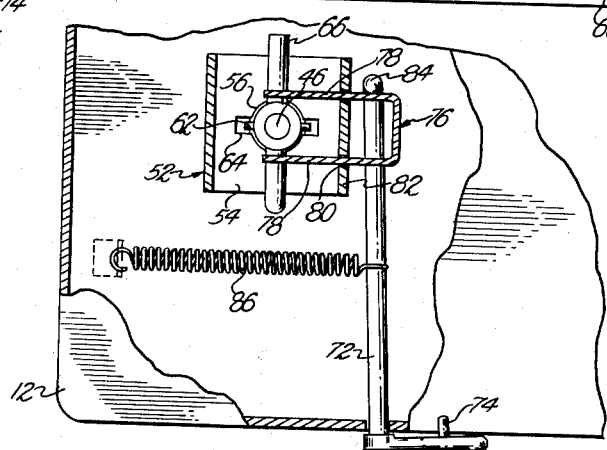
Fig. 5.
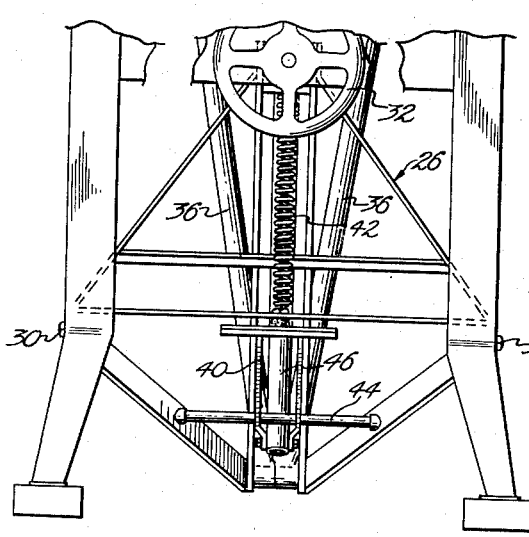
Fig. 6.
INVENTOR.
John R. Harclerode
BY
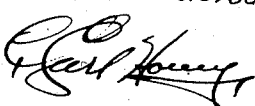
ATTORNEY

United States Patent Office 2,835,243  
Patented May 20, 1958

2,835,243

PRESSURE EQUALIZER ASSEMBLY FOR MASONRY SAWS

John R. Harclerode, Kansas City, Mo., assignor to Clipper Manufacturing Company, Kansas City, Mo., a corporation of Missouri Application September 10, 1956, Serial No. 608,770

8 Claims. (Cl. 125—13)

This invention relates to improvements in masonry saws and is a continuation-in-part of my copending application Serial No. 584,702, filed May 14, 1956, and has for its primary object to provide an improved pressure equalizer assembly differing from that disclosed in said application but having the same general principles of operation.

It is the most important object of the present invention to provide a yieldable coupling between a swingable cutter assembly and a manual control lever therefor which is inexpensive to manufacture and simple to operate, yet capable of quickly responding to movement of a cutter disc as it strikes relatively hard substances.

A further object of the instant invention is to provide an equalizer that incorporates as a part thereof manual means for rendering the resilient connection ineffectual, yet maintaining a pivotal connection between the cutter assembly and linkage that joins the same with the manual control.

A still further important object of the present invention is to provide an equalizer that couples with the cutter assembly in a manner to permit rapid removal of the assembly from the machine as may be desired.

In the drawings:

Fig. 4 is an enlarged plan view of the machine shown in Figure 1.

Fig. 5 is a partial plan view still further enlarged, parts broken away to illustrate the improvements shown by Fig. 2; and Fig. 6 is a fragmentary, front elevational view of the machine.

Figure 1:
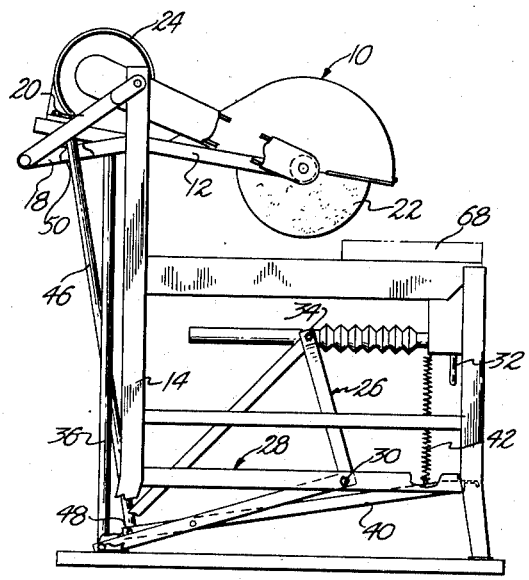
Figure 1 is a side elevational view of a masonry saw employing the pressure equalizer assembly forming the subject matter of the instant invention.
Figure 3:
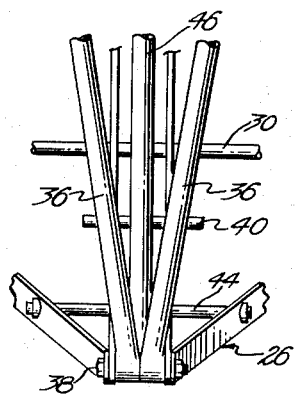
Fig. 3 is a fragmentary, enlarged, rear elevational view showing the lowermost end of the linkage connection between the cutter assembly and the manual controls.
Figure 2:
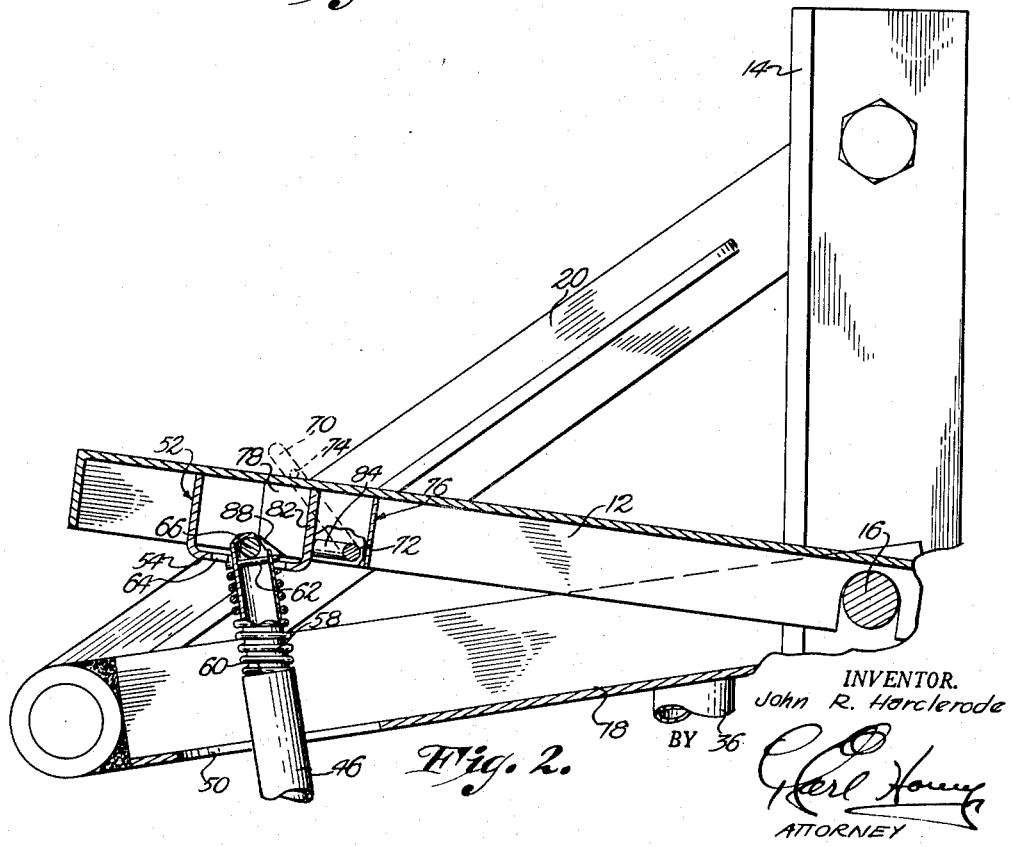
Fig. 2 is an enlarged, fragmentary, sectional view showing the pressure equalizer assembly for the machine illustrated in Figure 1.

As above indicated, the masonry saw shown in Figure 1 of the drawings is essentially the same as that disclosed in my said copending application, and its operation need only be generally outlined in order to understand the principles of the equalizer illustrated best in Figs. 2 and 5.

A cutter assembly broadly designated by the numeral 10, includes a vertically swingable platform 12 disposed between the uppermost extended ends of a pair of rear legs 14 and carried by a horizontal shaft 16 in the manner best seen in Fig. 2. Shaft 16 is in turn attached to a support 18 and the latter is pivotally attached to the legs 14 by a pair of arms 20. Platform 12 carries a rotatable cutter disc 22 and an electric motor 24 operably connected with the disc 22.

It is to be noted that shaft 16 is not attached to the legs 14 in any manner and, therefore, may be raised and lowered with respect thereto upon swinging of a triangular frame 26 having pivotal connection with framework 28 of the machine at 30. Swinging movement is imparted to the triangle 26 by rotation of a hand wheel 32 which rotates a screw having a follower nut thereon (all not shown) and which follower nut pivotally connects with the triangle 26 at 34. A pair of rods 36 at the rearmost end of the machine is fixed to the support 18 at the uppermost ends thereof and pivotally connected with the triangle 26 at 38.

Swinging movement of the assembly 10 about the horizontal shaft 16 and independent of the adjustment of the height of the shaft 16 through use of the hand wheel 32, is accomplished by depressing a foot lever 40 against the action of a spring 42, the vertically swingable lever 40 being pivotally coupled with the triangle 26 by a short shaft 44. The rearmost and normally lowermost end of the lever 40 is coupled with a vertically reciprocable actuator rod 46 by a pivot pin 48, the rod 46 extending through a clearance opening 50 in the support 18.

The operable connection between rod 46 and the platform 12 forms the subject matter of the instant invention and as seen in Figs. 2 and 5, a U-shaped bracket 52 is secured rigidly to the lowermost face of the platform 12 near the rearmost end of the latter, and its bight 54 is provided with a clearance opening 56 that loosely receives the rod 46 but whose diameter is less than that of a spring 58 coiled about the rod 46 to the end that the spring 58 normally engages the lower face of the bight 54. Spring 58 is interposed between an upwardly facing shoulder 60 on the rod 46 and a crosspin 62 extending through the rod 46. The crosspin 62 is provided to maintain the spring 58 on the rod 46 when the latter is detached from the platform 12 and a clearance slot 64 registering with opening 56 is provided in the bight 54 for the crosspin 62.

A second crosspin 66 in the rod 46 overlies the bight 54 and it is, therefore, seen that when spring 42 is permitted to raise the lever 40 to the position shown in Figure 1, rod 46 imparts a pulling action to the platform 12 through the pin 66 engaging bight 54, thereby swinging the cutter disc 22 upwardly as the platform 12 swings vertically about the axis of shaft 16.

Conversely, when the foot lever 40 is depressed downwardly against the action of spring 42, an upward pushing motion is imparted to the rod 46, thereby raising the rearmost end of the platform 12 through the spring 58 engaging the lower face of bight 54. During such movement of the cutter disc 22 downwardly toward a reciprocable work-receiving table 68, the pin 66 is free to move upwardly away from the bight 54 and the pin 62 is free to move upwardly through the slot 64.

Consequently, when the machine is placed in use to cut relatively hard substances such as masonry materials on the table 68, the spring 58 will readily yield whenever the disc 22 strikes relatively hard substances forming a part of the workpiece being severed, grooved or otherwise cut through use of the disc 22.

Although during use of the machine the operator is free to raise and lower the disc 22 by manipulating the lever 40 with his foot, and thereby relieve the pressure of the disc 22 on the workpiece as cutting becomes more difficult, the spring 58 augments such action on the part of the operator and thereby not only protects the disc 22, but provides an overall, smooth cutting operation.

In the event however, that it is desired to render spring 58 ineffectual and establish a direct pivotal connection between the rod 46 and the platform 12, it is but necessary to swing a small crank 70 from the position shown in Fig. 5 to the dotted-line position illustrated by Fig. 2 of the drawings. Such 90° swinging movement of the crank 70 rotates a shaft 72 to which it is affixed, it being noted that crank 70 is provided with an inwardly extending stop 74 engageable with the upper face of the platform 12 to limit the extent of swinging movement of the crank 70 in both directions.

A reciprocable, U-shaped latch 76 beneath the platform 12 has its legs 78 extending through slots 80 in the forwardmost leg 82 of the bracket 52. The shaft 72 extends through the said legs 78 and terminates in a right angle finger 84. A spring 86 interconnecting the shaft 72 and the platform 12 yieldably holds the legs 78 biased toward the pin 66 with cam edges 88 of legs 78 engaging the said pin 66. Consequently, when crank 70 is in the position shown in Fig. 5 and the finger 84 is extending upwardly, spring 86 holds the legs 78 interposed between the platform 12 and the pin 66.

When the crank 70 is swung to the position shown in Fig. 2, finger 84 is moved against the leg 82 of bracket 52, thereby withdrawing the key or latch 76 against the action of spring 86 from between the platform 12 and the pin 66.

Relative loose connections are provided between the shaft 72 and the platform 12, as well as the latch 76 and between the latter and the bracket 52 and, by virtue of the reciprocable movement of the latch 76, it is desirable that the shaft 72 extend at a slight angle as shown in Fig. 5.

When it is desired to remove the assembly 10, it is but necessary to remove pin 66 and simply lift the platform 12 off of the shaft 16. It is to be noted also that there is provided a pivotal connection between the rod 46 and the platform 12 whether or not the latch 76 is used because the pin 66 is still free to rotate with respect to cam edges 88, even while the spring 86 holds the latch 76 in the position shown in Fig. 5.

Having thus described the invention what is claimed as new and desired to be secured by Letters Patent is:

1. In a machine of the kind described, a swingable cutter assembly having an opening on one side of its axis of swinging movement; a reciprocable actuator for said assembly extending into said opening; a stop secured to the actuator on one side of the opening; a spring between the assembly and the actuator on the opposite side of the opening for yieldably holding the stop in engagement with the assembly; and releasable means engageable with the stop for locking the latter against the assembly.

2. In a machine of the kind described, a cutter assembly having a vertically swingable platform; a bracket secured to the platform and provided with an opening; a vertically reciprocable rod extending into the opening and depending from the bracket, said rod having a crosspin above the opening and a shoulder below the opening; and a spring coiled about the rod between the shoulder and the bracket for yieldably holding the pin against the bracket.

3. In a machine of the kind described, a cutter assembly having a vertically swingable platform; a bracket secured to the platform and provided with an opening; a vertically reciprocable rod extending into the opening and depending from the bracket, said rod having a crosspin above the opening and a shoulder below the opening; a spring coiled about the rod between the shoulder and the bracket for yieldably holding the pin against the bracket; and lock means insertable between the platform and the pin for rigidly holding the pin against the bracket.

4. In a machine of the kind described, a cutter assembly having a vertically swingable platform; a bracket secured to the platform and provided with an opening; a vertically reciprocable rod extending into the opening and depending from the bracket, said rod having a crosspin above the opening and a shoulder below the opening; a spring coiled about the rod between the shoulder and the bracket for yieldably holding the pin against the bracket; lock means between the platform and the pin for rigidly holding the pin against the bracket; and manual control means for withdrawing said lock means from between the pin and the platform.

5. In a machine of the kind described, a cutter assembly having a vertically swingable platform; a bracket secured to the platform and provided with an opening; a vertically reciprocable rod extending into the opening and depending from the bracket, said rod having a crosspin above the opening and a shoulder below the opening; a spring coiled about the rod between the shoulder and the bracket for yieldably holding the pin against the bracket; movable lock means carried by the platform; and resilient means for yieldably holding the lock means between the platform and the pin to rigidly maintain the pin in engagement with the bracket.

6. In a machine of the kind described, a cutter assembly having a vertically swingable platform; a bracket secured to the platform and provided with an opening; a vertically reciprocable rod extending into the opening and depending from the bracket, said rod having a crosspin above the opening and a shoulder below the opening; a spring coiled about the rod between the shoulder and the bracket for yieldably holding the pin against the bracket; movable lock means carried by the platform; resilient means for yieldably holding the lock means between the platform and the pin to rigidly maintain the pin in engagement with the bracket; and manual control means insertable between the bracket and the lock means for withdrawing the latter from between the platform and the pin against the action of said resilient means.

7. In a machine of the kind described, a cutter assembly having a vertically swingable platform; a bracket secured to the platform and provided with an upright wall and a substantially horizontal panel, said panel being provided with an opening and said wall having an elongated slot therein; a vertically reciprocable rod extending into the opening and depending from the bracket, said rod having a crosspin above the panel and a shoulder below the same; a spring coiled about the rod between the shoulder and said panel for yieldably holding the pin against the bracket; a wedge-shaped lock member reciprocably mounted in the slot and movable to and from a position between the platform and the pin to maintain the latter in rigid engagement with the panel; resilient means for yieldably holding said lock member in said position; and manual control means insertable between said wall and the lock member for withdrawing the latter from said position against the action of said resilient means.

8. In a machine of the kind described, a cutter assembly having a vertically swingable platform; a bracket secured to the platform and provided with an upright wall and a substantially horizontal panel, said panel being provided with an opening and said wall having an elongated slot therein; a vertically reciprocable rod extending into the opening and depending from the bracket, said rod having a crosspin above the panel and a shoulder below the same; a spring coiled about the rod between the shoulder and said panel for yieldably holding the pin against the bracket; a wedge-shaped lock member reciprocably mounted in the slot and movable to and from a position between the platform and the pin to maintain the latter in rigid engagement with the panel; an elongated, manually operable control arm, one end of the arm being pivotally and rotatably connected to the platform and the opposite end thereof being rotatably coupled with the lock member on the side of said wall away from the pin; resilient means interconnecting the arm and the platform for biasing the arm toward the panel and in turn, the lock member into said position; and an elongated cam element on said opposite end of the arm, disposed perpendicularly to the arm and engageable with the panel upon rotation of the arm for shifting the latter away from the panel and thereby withdrawing the lock member from said position against the action of said resilient means.

References Cited in the file of this patent

UNITED STATES PATENTS 2,581,777 Wright  Jan. 8, 1952
2,591,206 Scott  Apr. 1, 1952